United States Patent [19]

White

[11] Patent Number: 5,758,998

[45] Date of Patent: Jun. 2, 1998

[54] ROUTER APPARATUS

[76] Inventor: Paul Ernest White, 5 Cooper Street, Traralgon, Victoria 3844, Australia

[21] Appl. No.: 406,038

[22] Filed: Mar. 16, 1995

[30] Foreign Application Priority Data

Mar. 17, 1994 [AU] Australia ................... PM4495
Dec. 23, 1994 [AU] Australia ................... PN0282

[51] Int. Cl.⁶ ........................................... B23C 1/20
[52] U.S. Cl. ............... 409/180; 144/134 D; 144/136 C; 409/182
[58] Field of Search .................... 408/180, 181, 408/182, 178, 179, 175; 144/134 D, 136 C

[56] References Cited

U.S. PATENT DOCUMENTS

| 2,839,107 | 6/1958 | Emmons | 144/134 D |
|---|---|---|---|
| 2,943,655 | 7/1960 | Pedersen et al. | 144/134 D |
| 3,376,787 | 4/1968 | Morganson | 409/180 |
| 3,478,788 | 11/1969 | Zelik | 144/136 C |
| 4,031,934 | 6/1977 | Stadler | 144/218 |
| 4,281,694 | 8/1981 | Gorman | 144/134 D |
| 4,294,297 | 10/1981 | Kieffer | 144/134 D |
| 4,470,439 | 9/1984 | Sanders | 144/136 C |
| 4,630,657 | 12/1986 | Obradovich | 409/182 |
| 4,777,991 | 10/1988 | Adame | 409/182 |
| 5,345,986 | 9/1994 | Kieffer | 144/372 |

FOREIGN PATENT DOCUMENTS 954737  11/1956  Germany ................... 144/134 D

*Primary Examiner*—Daniel W. Howell
*Attorney, Agent, or Firm*—Walter C. Farley

[57] ABSTRACT

A router guide apparatus comprising a guide carrier member located on the ends of guide rods extending into the base part of the router, the carrier member rotatably mounting a guide follower member of non-circular disc form for rolling engagement with and along an edge of a workpiece, the follower member having its workpiece engaging surface abraded to assist in its frictional non-slip engagement with the edge of the workpiece. The guide apparatus may be provided with spring members to ensure constant engagement of the follower member with the edge of the workpiece.

14 Claims, 6 Drawing Sheets

ROUTER APPARATUS

FIELD OF THE INVENTION

THIS INVENTION relates to an improved apparatus for guiding a router relative to a workpiece, and more particularly to a router guide apparatus and method wherein a profiled guide follower roller member is maintained in continuous rolling engagement with a guide surface edge of a workpiece as the roller member and router bit are moved together relative to the workpiece.

The router is a tool particularly useful in being able to cut grooves including patterned grooves into the face of a workpiece.

BACKGROUND OF THE INVENTION

Routers are usually provided with a guide carrier secured to mounting rods that extend laterally from the router and by means of which the movement of the router is, during use, controlled to follow a required path. The rods pass into and through passageways in the base of the router and are held in position therein by means of locking screws fitted to the router base. The guide carrier may have roller members attached thereto for engaging the edge of the workpiece or shoes or slippers may be attached to the guide carrier for sliding engagement against an edge of the workpiece. In use with this conventional type router guide arrangement the operator has to concentrate on holding the router in such a manner that the guide rollers or shoes are continuously in engagement with the edge of the workpiece in order to faithfully follow the line of cut of the router bit.

Whereas the above-described router is eminently suitable for cutting standard continuous linear extending slots or grooves in the workpiece, problems which have arisen in providing non-linear or curved grooves or slots have been to some extent been overcome by using templates either clamped to the workpiece or adjacent the workpiece. In this regard it has also been proposed to guide the router on tracks of a frame mounted on the workpiece or attached to the router base.

These prior art proposals for using the router to cut non-linear grooves in the workpiece have not been successfully applied in cutting patterned grooves in the face or an edge of the workpiece and it is an object of the present invention to provide a router guide attachment utilising rotatable profiled follower disc members operable to enable the router bit to cut grooves in a workpiece to a wide range of scalloped, or wave like non-symmetrical patterns for the purpose of en graving a workpiece with a decorative finish. It is also an object of the present invention to provide a router guide apparatus adaptable for attachment to various sizes of routers. It is a further object of the present invention to provide a router guide apparatus which ensures constant engagement of a follower guide member or members with an edge of the workpiece without manual engaging effort by the operator of the router to hold the guide member against the edge of the workpiece in the movement of the router bit over the face or an edge of the workpiece.

In my Australian Patent Application No. PM4495 I have described a standard guide attachment utilising a limited range of profiled follower disc members and in my Australian Patent Application No. PN0282 I have described the use of a wider range of discs to provide a greater range of non-symmetrical patterns and also an embodiment of the invention in respect of a modified router guide apparatus.

SUMMARY OF THE INVENTION

According to one aspect of the invention there is provided a router guide apparatus comprising a guide carrier member mounted on the ends of guide rods slidable laterally in passageways in a base part of the router and adapted to be releasably secured therein, a bracket member mounted on said carrier member and extending inwardly towards the router and a profiled guide follower member rotatably mounted on the inner end of said bracket for rolling engagement with and along an edge of a workpiece.

The rotatable guide follower member may be of non-circular disc form with the workpiece engaging surface thereof being abraded to assist in its frictional non-slip engagement with the edge of the workpiece.

Alternately the rotatable guide follower member may be of plain curved disc form mounted on an off-centre spindle on said bracket member with the edge of the disc suitably abraded.

According to a further aspect of the invention there is provided a router guide apparatus comprising a guide carrier member mounted at one end of guide rods slidable laterally through passageways in a base part of the router, said carrier member mounting a rotatable guide follower guide member for engagement with one edge of a workpiece positioned between the router and the carrier member, the other ends of the rods mounting stop members releasably fixed thereon, slidable further members mounted on the rods between said fixed stop members and the router, and spring members mounted on said rods between the fixed stop members and the slidable members and adapted to urge said slidable members towards and against a second edge of the workpiece opposite said one edge so as to maintain said guide follower member in rolling contact with said one edge of the workpiece.

The fixed stop members and the slidable members may comprise a pair of crossmembers and the slidable crossmember may be provided with a shoe member for sliding engagement with the second edge of the workpiece or may be provided with roller members, either on the slidable crossmember or on brackets adjustably extending therefrom with the location of the roller members being perpendicularly adjustable on the slidable crossmember or on the extended ends of the brackets.

The guide follower member on said carrier member may be in the form of a slipper or shoe member adapted for sliding engagement along said one edge of the workpiece or may be a roller or roller members or a profiled roller member adapted to laterally move the router cutting bit to provide a patterned non-standard non-symmetrical cutting action by said cutting bit on the face or the edge of the workpiece.

DESCRIPTION OF THE PREFERRED EMBODIMENTS

Figure 1:
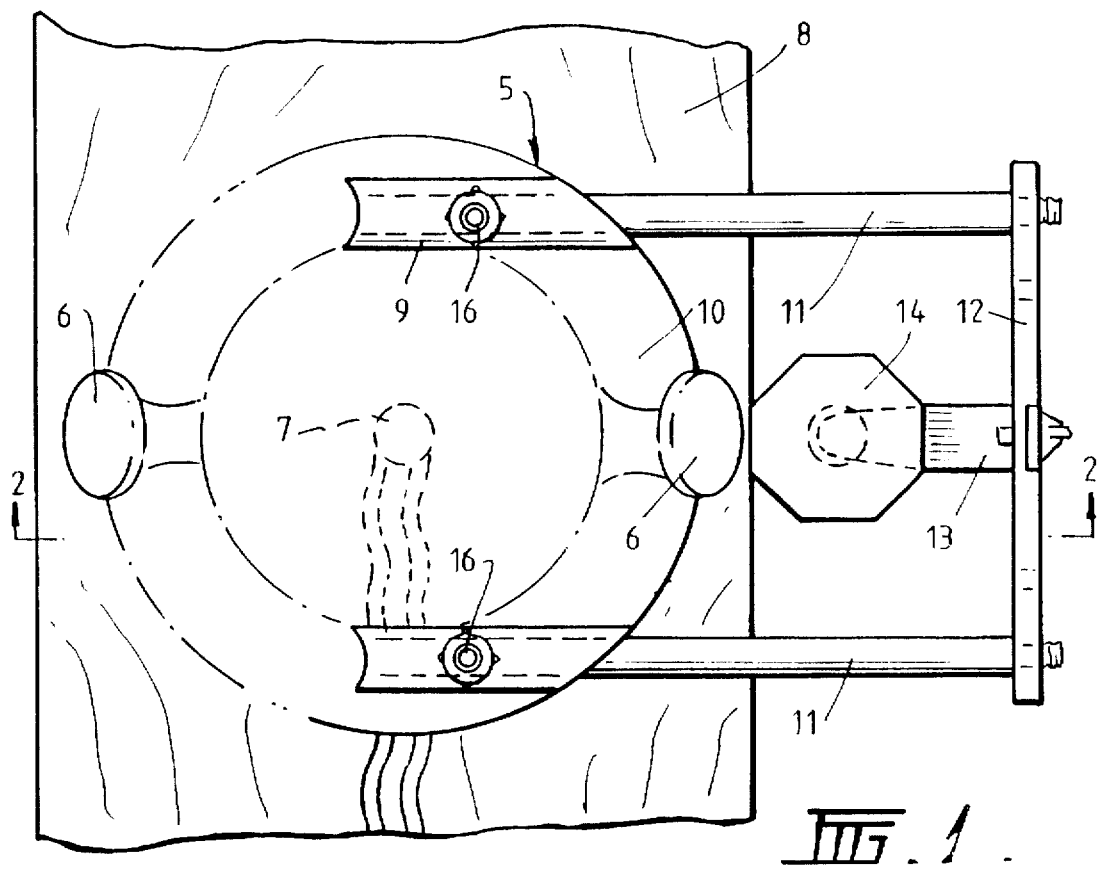
FIG. 1 is a plan view of an embodiment of the invention incorporating a profiled follower member.
Figure 2:
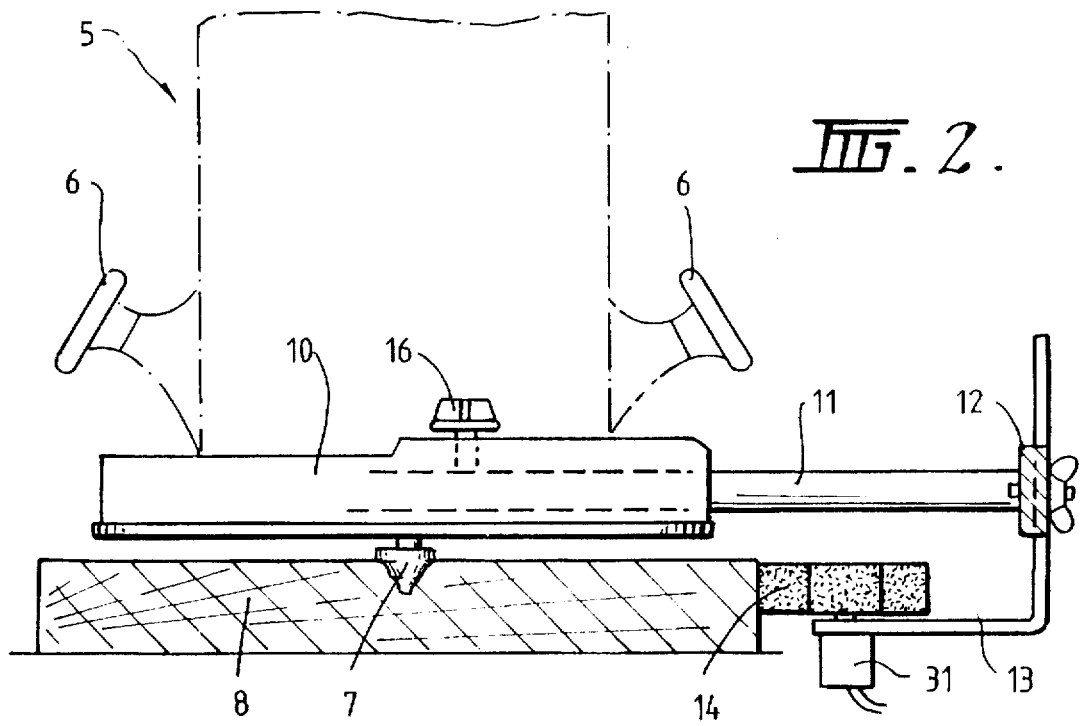
FIG. 2 is a side elevation taken along the line 2—2 of FIG. 1.

Referring to FIGS. 1 and 2 of the drawings there is illustrated a conventional router 5 with operator control handles 6 and a cutting bit 7 engageable with a face of a workpiece 8. The cutting bit 7 may be of a chosen shape to give a desired symmetrical pattern to the groove being cut as known with conventional routers.

Extending laterally through apertures 9 in the base plate 10 of the router 5 are rod members 11 connectable at one end thereof to a guide follower carrier plate 12 to which is attached a bracket member 13 supporting a profiled rotatable follower 14 engageable with an edge of the workpiece 8. In this embodiment rod members 11 extend only into the base plate 10 and are secured at the desired length by locking screws or the like 16. In use with this guide structure the operator grasps the router handles 6 so as to ensure during the cutting travel of the router that the profiled rotatable follower 14 firmly engages the edge of the workpiece and in rolling contact therewith. In order to prevent slip between follower 14 and the edge of the workpiece, the outer contacting edges of follower 14 are suitably abraded as by knurling, pitting or the application of emery cloth or like material. In this embodiment the router bit is moved both laterally and linearly in operation by reason of the shape of follower 14 to provide a scalloped or wavy decorative pattern in the groove cut by the router bit.

Figure 3:
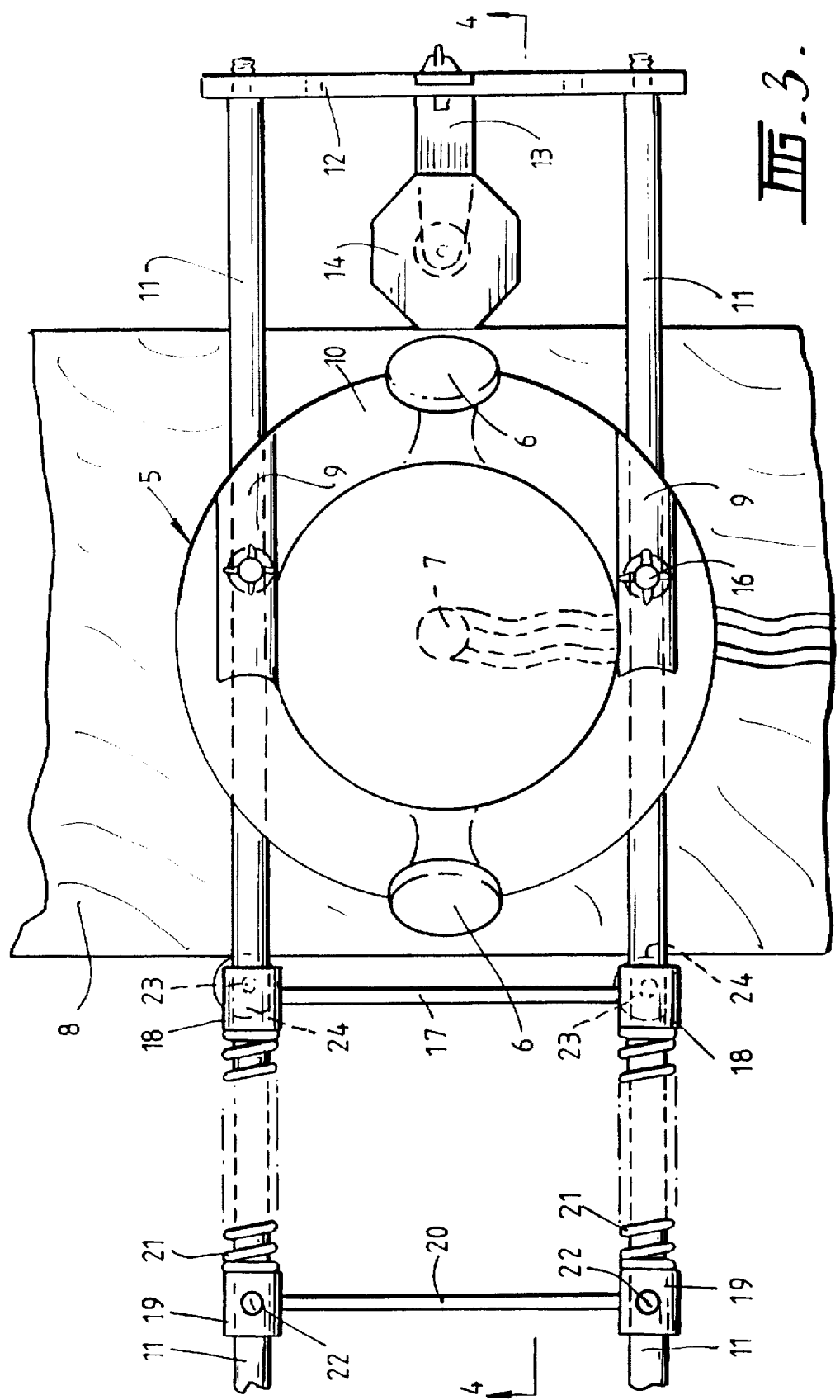
FIG. 3 is a plan view of another embodiment of the invention incorporating a profiled follower member and a spring-loaded guide apparatus.
Figure 4:
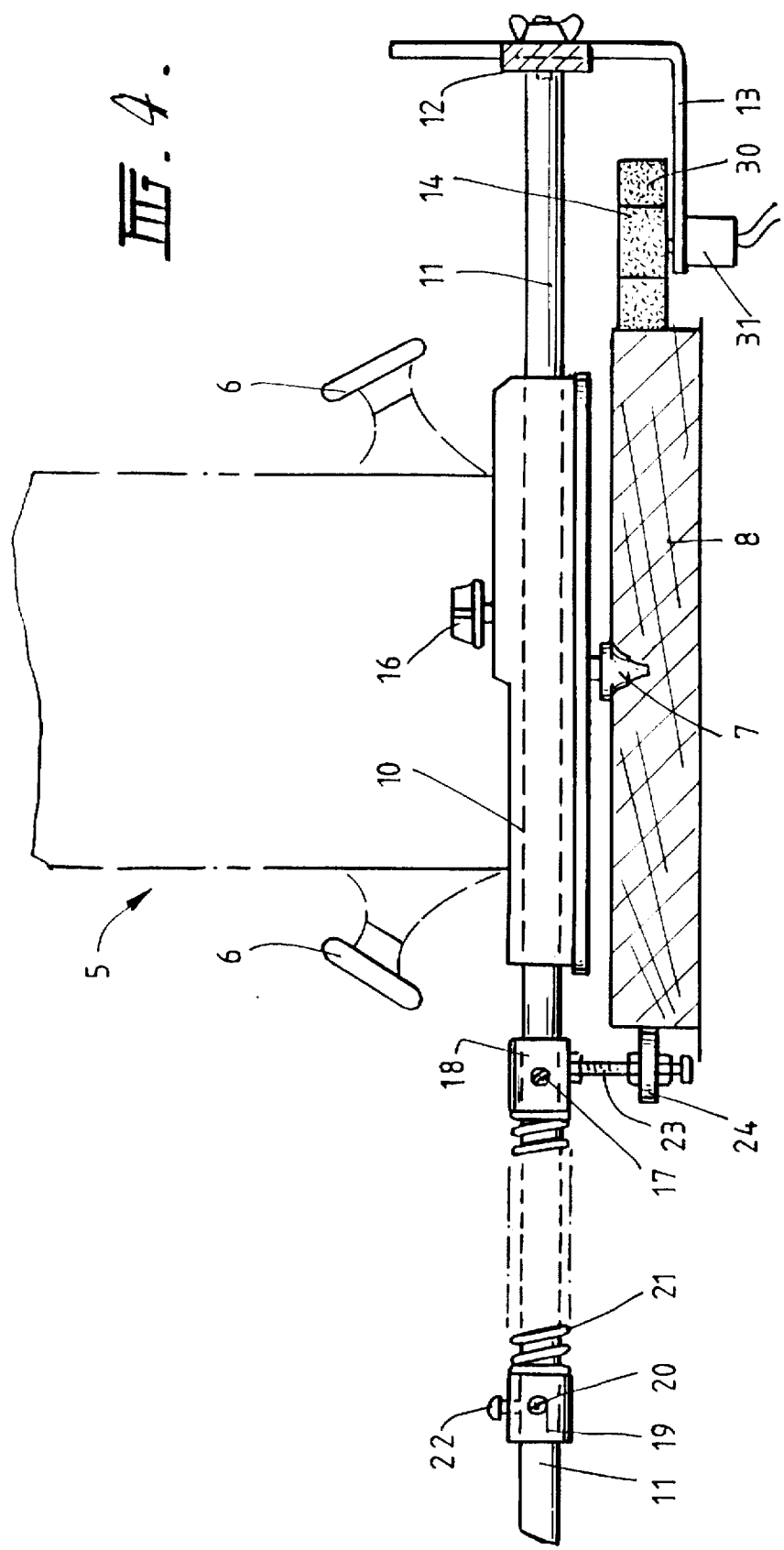
FIG. 4 is a side elevation taken along the line 4—4 of FIG. 3.

In another embodiment of the present invention as illustrated in FIGS. 3 and 4 the rod members 11 can be of extended length or can be extended by end to end screw joining so as extend through and beyond router 5 and pass through socket members 18 at each end of a spring-urged bar member 17. Rod members 11 extend on outwardly of bar member 17 through socket members 19 on bar member 20. Between socket members 18 and 19 there are located compression spring members 21 and sockets 19 are provided with locking screws 22. Depending from socket members 18 are rods 23 having roller members 24 rotatably and adjustably mounted thereon with roller members 24 engaging the edge of workpiece 8 opposite that engaged by profiled follower 14 on carrier plate 12. In use the position of bar member 20 is adjusted to compress spring members 21 to provide a firm but not gripping engagement of roller members 24 on the edge of the workpiece and then locked in position by locking screws 22.

Figure 8:
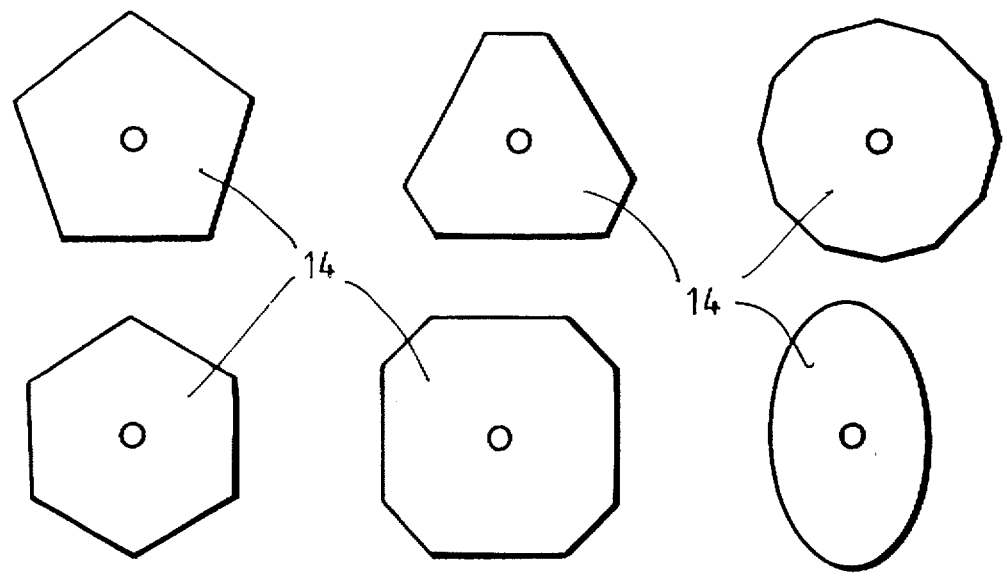
FIG. 8 is an illustration of several sample shapes of profiled follower members having centrally located mounting spindles of the invention.
Figure 9:
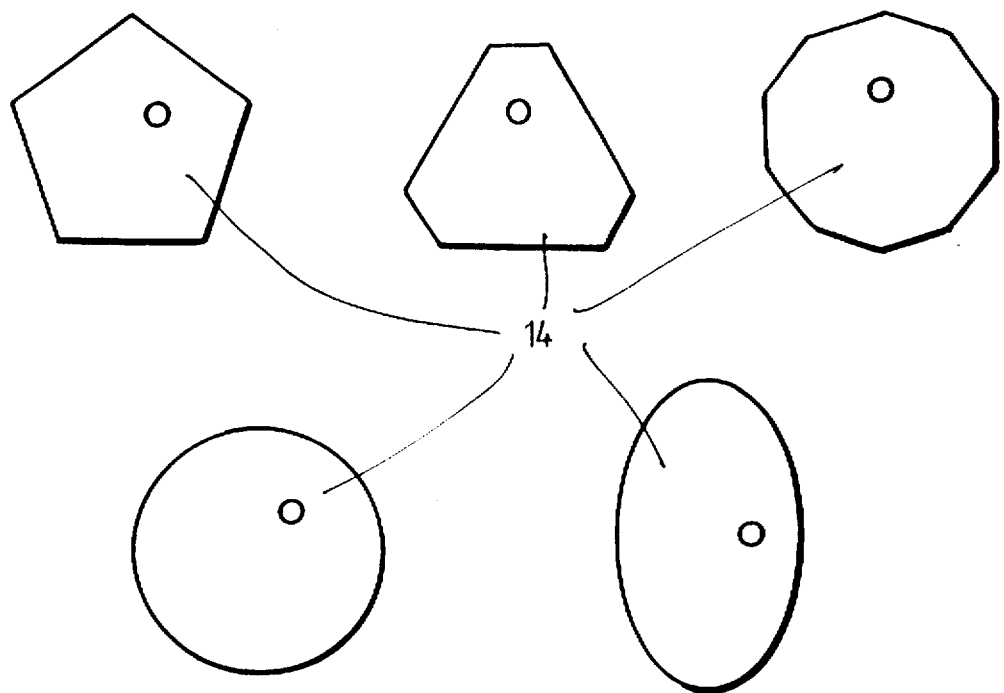
FIG. 9 is an illustration of several sample shapes of profiled follower members having offset mounting spindles for the follower members.

This spring-urged guide structure allows the operator to move the router along the desired path without having to exert sideways pressure on the guide follower and it is of special advantage when using non-circular profiled follower members such as 14 in FIGS. 1, 2, 3, 4 and 5 and the sample follower shapes in FIGS. 8 and 9.

Figure 5:
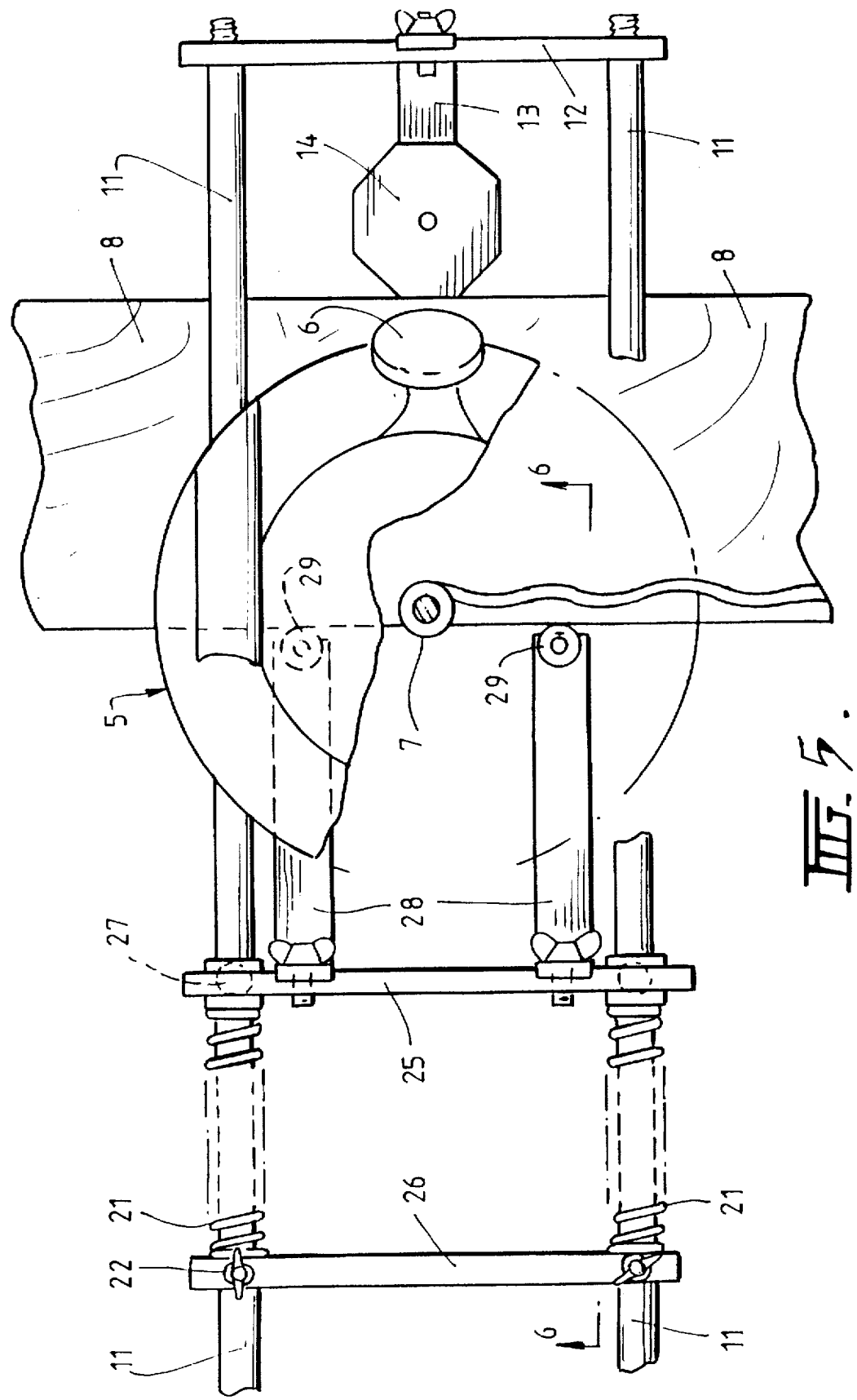
FIG. 5 is a plan view similar to FIG. 3 but illustrating another embodiment of the spring-urging engagement members of the guide apparatus.
Figure 6:
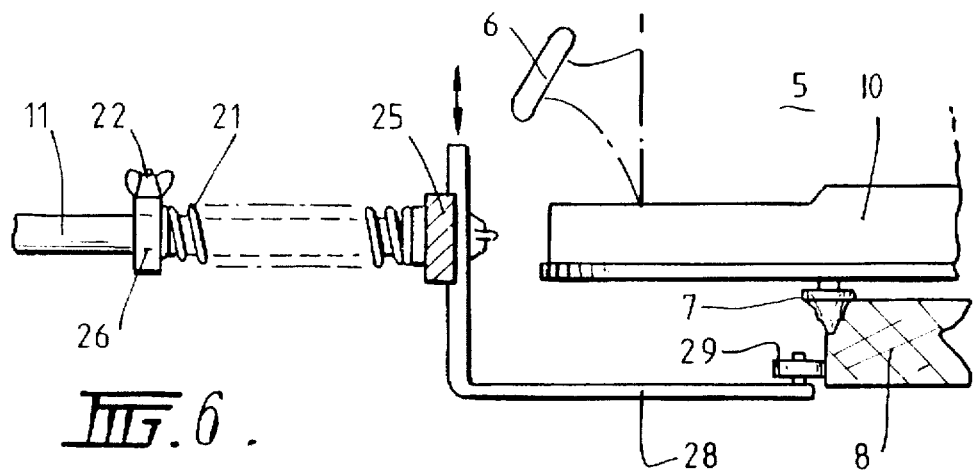
FIG. 6 is a part-sectional side view of the spring-urging members taken along the line 4—4 of FIG. 3.
Figure 7:
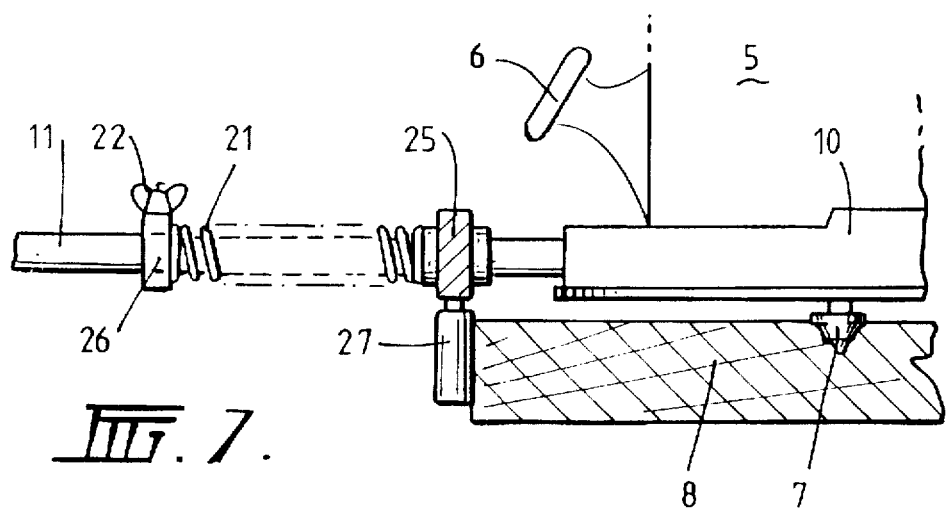
FIG. 7 is a part-sectional side view of the spring-urging members of FIG. 3 showing another engagement application against the workpiece.
Figure 10:
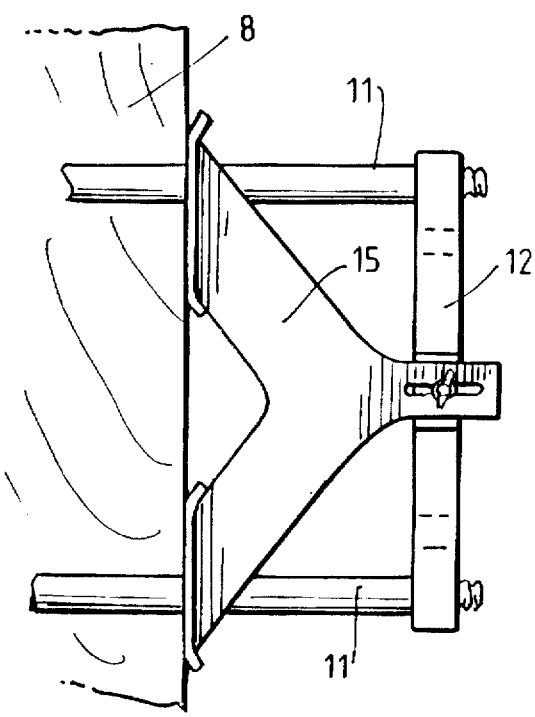
FIG. 10 is a plan view of a known guide follower shoe for straight line routing.

Referring to the embodiment of FIGS. 5, 6 and 7, the spring-urged structure of FIG. 7 acts in substantially the same manner as the structure of FIGS. 3 and 4 except that in the embodiment of this Figure, bar members 25 and 26 take the place of bars 17 and sockets 18 and bars 20 and sockets 19, and bar 25 is provided with rollers 27 engageable with an edge of the workpiece.

In FIGS. 5 and 6 there is illustrated the adjustable attachment of L-shaped brackets 28 to bar 25, said brackets 28 having roller members 29 located on their inwardly extending ends to engage the edge of the workpiece at a lower section thereof as more clearly shown in FIG. 6. This arrangement is most advantageous in allowing routing of the edge of a workpiece as shown in FIGS. 5 and 6.

The profiled guide follower 14 and the samples of FIGS. 8 and 9 have workpiece engaging surfaces suitably abraded as at 30 (FIG. 4) to ensure frictional engagement and continuing rolling engagement with the edge of the workpiece by the follower during use and this abrasive surface may be in the form of knurling, pitting or the application of emery cloth or like material to the engaging surface of the follower. With some shapes of profiled guide followers 14 including oval or cam shaped followers, it may be of advantage to drive the followers by a small variable speed motor 31 (FIG. 4) which may be conveniently mounted on the underside of bracket legs 13 and drivingly connected to the mounting spindle of the guide follower 14.

As indicated in dotted lines on carrier 12 in FIG. 3 the carrier 12 may be adapted to various size routers having differing dimensions between the router base plate apertures 9 and also differing diameters of rod members 11.

I claim:

1. A router guide apparatus comprising a guide carrier member mounted on the ends of guide rods adapted to be slidable laterally in passageways in a base part of the router and be releasable secured therein, a bracket member mounted on said carrier member and extending inwardly toward the router, and a profiled guide follower member rotatable mounted on the inner end of said bracket for rolling engagement with and along an edge of a workpiece, and wherein the workpiece engaging surface of the rotatable guide follower member is abraded to assist in its non-slip engagement with the edge of the workpiece and maintain the follower member in rolling contact with the edge of the workpiece.

2. A router guide apparatus according to claim 1 wherein the rotatable guide follower member is of non-circular faceted disc form.

3. A router guide apparatus according to claim 1 wherein the rotatable guide follower member is of disc form mounted on a off-centre spindle on said bracket member.

4. A router guide apparatus comprising a guide carrier member mounted at one end of guide rods slidable laterally through passageways in a base part of a router, said carrier member mounting a rotatable guide follower member for engagement with one edge of a workpiece positioned between the router and the carrier member, the other ends of the rods mounting stop members releasably fixed thereon, slidable further members mounted on the rods between said fixed stop members and the router, and spring members mounted on said rods between the fixed stop members and the slidable members and adapted to urge said slidable member towards and against a second edge of the workpiece opposite said one edge so as to maintain said guide follower member in rolling contact with said one edge of the workpiece.

5. A router guide apparatus according to claim 4 wherein said fixed stop members comprise a single crossmember and said slidable members comprise a single crossmember.

6. A router guide apparatus according to claim 5 wherein said slidable crossmember has attached thereto a shoe member slidably engageable with said second edge of the workpiece.

7. A router guide apparatus according to claim 5 wherein said slidable crossmember has attached to and depending therefrom one or more roller members engageable with said second edge of the workpiece.

8. A router guide apparatus according to claim 7 wherein said one or more roller members are located on the ends of laterally extending bracket members which are attached at their other ends to said slidable crossmember.

9. A router guide apparatus according to claim 8 wherein said roller members are vertically adjustable with respect to said slidable crossmember.

10. A router guide apparatus according to claim 9 wherein the bracket members are laterally adjustable in length and said roller members are vertically adjustable on said brackets.

11. A router guide apparatus according to claim 4 wherein the workpiece rotatable guide follower member is of non-circular disc form and the engaging surface of the rotatable guide follower member is abraded to assist in its non-slip engagement with the edge of the workpiece so as to maintain the follower member in rolling contact with said one edge of the workpiece.

12. A router guide apparatus according to claim 11 wherein the rotatable guide follower member is drivingly connected to a small variable speed motor.

13. A profiled rotatable guide follower member for attachment to a router guide apparatus so as to be engageable with an edge of a workpiece, said member being of non-circular faceted disc form, with the edge parts thereof having an abraded surface to assist in its non-slip engagement with the edge of the workpiece.

14. A profiled rotatable guide follower member for attachment to a router guide apparatus so as to be engageable with an edge of a workpiece, said member being of circular or oval disc form mounted off-center on a spindle for rotation thereon, and wherein a workpiece engaging surface of the rotatable guide follower member is abraded to assist in its non-slip engagement with the edge of the workpiece and maintain the follower member in rolling contact with the edge of the workpiece.

* * * * *